Patented Apr. 18, 1939

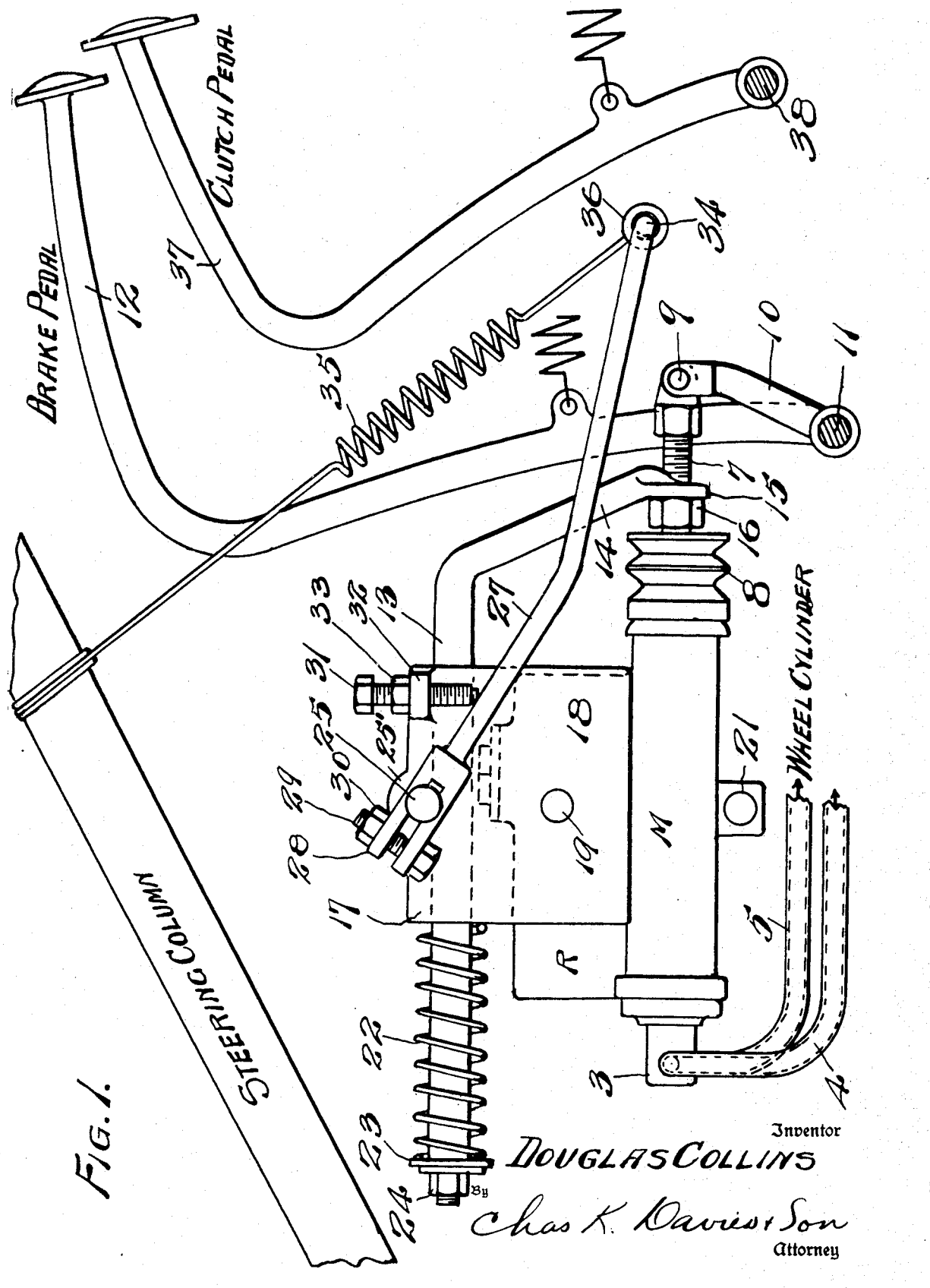

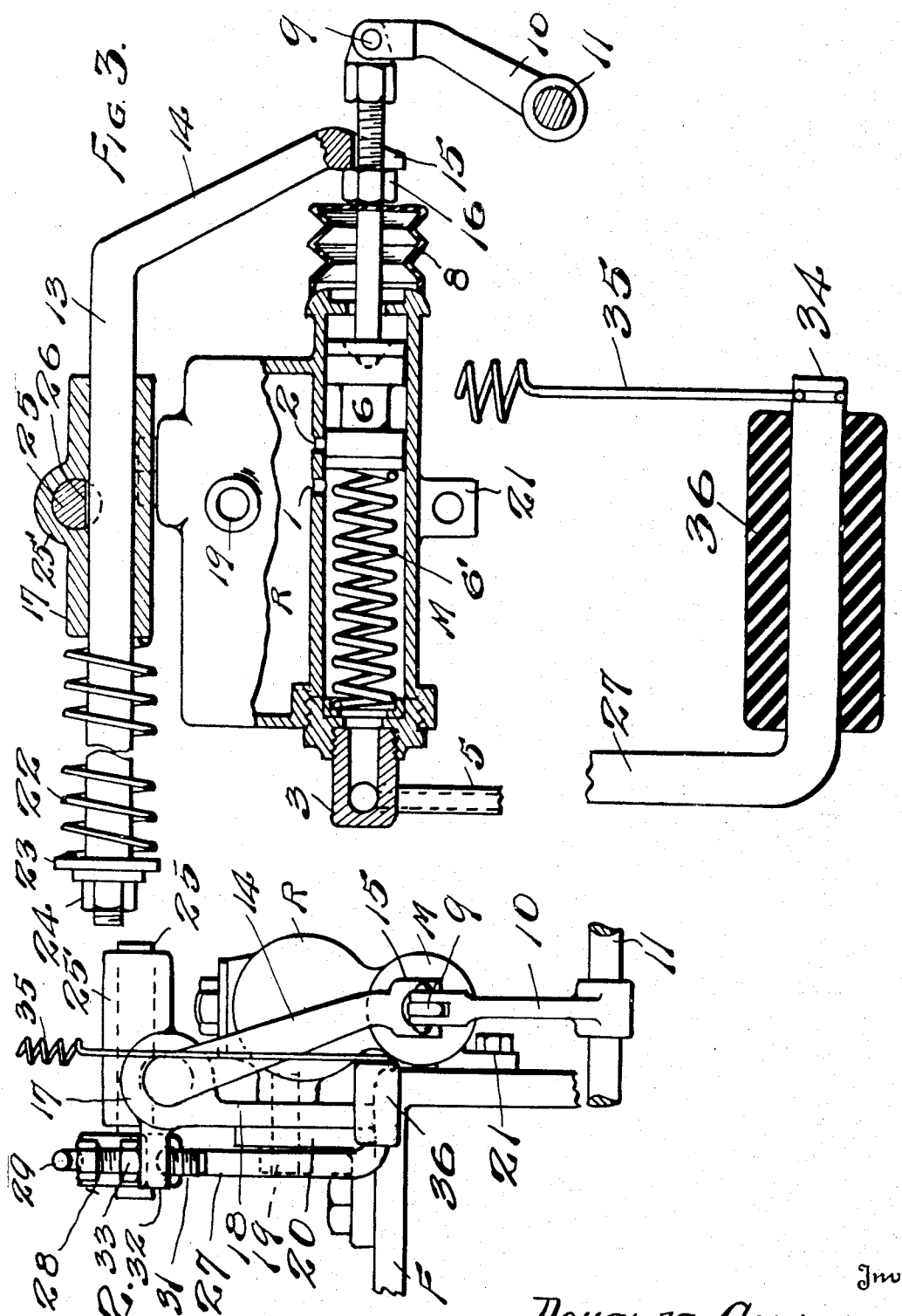

2,155,302

UNITED STATES PATENT OFFICE 2,155,302

HYDRAULIC BRAKING SYSTEM

Douglas Collins, Salisbury, N. C.

Application August 6, 1936, Serial No. 94,712

18 Claims. (Cl. 192—13)

My present invention relates to improvements in hydraulic braking systems for automotive vehicles, wherein the brake pedal and the clutch pedal of the vehicle are utilized, in combination with the master cylinder of the brake-applying and releasing mechanism, for holding applied the brakes to assist the driver of the vehicle in manipulating the control devices, especially in starting the vehicle. In carrying out my invention I employ an automatically operating or spring-follower for co-action with the piston-plunger of the master cylinder of the brake system, which follower is capable of holding or locking the fluid-pressure operated brakes applied after the brake pedal has been released, and said locking or holding action is accomplished through the instrumentality of the clutch pedal of the driving mechanism of the vehicle, when the clutch pedal is depressed to disengage the clutch. The operation of releasing the clutch pedal, thereafter, releases the locked holding means, which, in turn releases the automatically operating follower, thereby permitting automatic retraction of the piston-plunger of the master cylinder and consequent release of the brakes.

The auxiliary device of my invention may readily be adapted for use with standard types of hydraulic brakes now in use at comparatively low cost, without in any way impairing the efficiency and facile operation of the brake mechanism, or of the clutch operating mechanism, and these devices or appliances may be utilized in usual manner for customary performance of their respective functions, without benefit of the auxiliary device of my invention.

As one example of the utility of the device of my invention the holding or locking features may be employed in starting the vehicle while standing on an up-grade, for instance. Assuming that the brakes are in applied position, or set, and the clutch pedal and clutch are in engaged position; the driver depresses the clutch pedal with one foot to disengage the clutch and by this action the auxiliary holding device becomes effective to hold the brakes applied. The driver is now enabled to remove his other foot from the brake pedal and apply it to the accelerator or fuel-control pedal. Then, by con-joint use of one foot on the clutch pedal and the other foot on the accelerator, he may with facility release the set brakes and apply the propulsive power to the vehicle, thereby avoiding rear drifting or backward roll of the vehicle, and enabling the driver to make a smooth and easy forward start of the vehicle.

The invention consists in certain novel combinations and arrangements of parts for the purpose above outlined as will hereinafter be more fully set forth and claimed. In the accompanying drawings I have illustrated one complete example of the physical embodiment of my invention wherein the parts are combined and arranged according to one mode I have thus far devised for the practical application of the principles of my invention. It will be understood that changes and alterations may be made in these exemplifying structures, within the scope of my claims without departing from the principles of my invention.

Figure 1 is a view in side elevation showing so much of a standard type of hydraulic braking system for automotive vehicles as is necessary to illustrate the relation thereto of the auxiliary device of my invention, together with the clutch pedal of an automobile; the parts being shown with the brakes released, and the clutch engaged.

Figure 2 is an end elevation of the auxiliary device, as seen from the right in Figure 1, and with some parts omitted.

Figure 3 is a detail view showing some of the parts in longitudinal section, and illustrating the spring-returned piston-plunger of the master cylinder together with the spring-follower of the hill-holder and its locking means.

Figure 4 is an enlarged, detail, sectional view of the cushioned follower-lever with which the clutch pedal co-acts in locking the follower.

In order that the general assembly and arrangement of parts may readily be understood I have shown the master cylinder M and its reservoir R as parts of a standard type of hydraulic braking mechanism for automotive vehicles, in which the reservoir supplies oil to the cylinder through the use of the two spaced ports 1 and 2 that afford communication between the reservoir and the cylinder. Suitable connections may be made to the cylinder for distributing the oil under pressure from the cylinder to the wheel cylinders or brake cylinders of the braking system, as for instance a distributing connection 3, here shown as a hollow screw plug threaded in the ported end of the master cylinder M. Only two pipe-lines, 4 and 5, for oil under pressure, are here shown connected to the distributer 3 and indicated as extending to the two rear wheel cylinders of the braking system, but it will be understood that other arrangements may be made for distribution of oil under pressure from the master cylinder to a number of wheel cylinders for the application of the brakes.

Within the master cylinder is mounted a reciprocal piston plunger 6, which is pushed by means of the stem 7 in one direction to create hydraulic pressure for the application of the brakes, and a spring 6' between the ported end of the cylinder and the inner end of the piston-plunger returns the piston-plunger in the opposite direction when the hydraulic pressure is released, the brake-release position being indicated in Figure 2 of the drawings.

The plunger stem 7 which projects through one end of the cylinder, also extends through a rubber or flexible hood 8 exterior of the cylinder, and the outer end of the stem, as here shown, is pivoted at 9 to an arm 10 that its mounted on and rigid with the brake shaft 11. The brake shaft is journaled to rock in suitable bearings, and the brake pedal 12, rigid with the shaft, when depressed, is employed to transmit motion through the stem to the piston plunger to apply the hydraulic braking pressure against the tension of the spring 6'. When the brake pedal is released, the spring 6' automatically returns the plunger to non-pressure position, in usual manner, and the released brake pedal is also spring-returned, as is customary.

In combination with the stem 7 of the piston-plunger of the brake-applying mechanism, I employ an automatic, or spring-actuated, follower which comprises a slide rod or bar 13 mounted above the cylinder M to reciprocate in a plane parallel with the movement of the piston-plunger, and this rod is fashioned with a bent end 14 that terminates in a forked head 15 which straddles the stem 7 and engages against a fixed abutment 16 mounted on the stem exterior of the cylinder. The slide rod is mounted to reciprocate in bearing sleeve 17 which is integral, or rigid, with an attaching plate 18, and this plate, which is of rectangular shape is bolted at 19 to the wall of the reservoir R of the master cylinder. An angle bracket 20 through which the bolt 19 passes, is bolted to the stationary frame member indicated at F in Figure 2, and in addition, the master cylinder is preferably bolted to the frame F at 21. The squared bottom edge of the attaching plate 18 rests upon the frame F, and it will therefore be seen that the support for the follower and the master cylinder are rigidly mounted in fixed relation on the stationary frame member F so that the reciprocating piston-plunger and the slide rod may move in unison for the usual and customary application and release of the brakes.

It will be noted that as the brakes are applied by depressing the brake pedal, the slide rod, due to action of its spring 22, also moves, automatically, with the piston-plunger. For this purpose, the spring 22 is coiled about the slide rod and interposed between the bearing sleeve 17 and a spaced collar 23 at the end of the rod, and a nut 24 threaded on the end of the rod retains the collar in position. The nut may be turned to adjust or vary the tension of the spring 22, and it will be understood that the tensile strength of spring 22 is less than that of the master-cylinder spring 6' in order that the latter spring may slide the rod and compress its spring 22, when the hydraulic pressure of the brakes is released. As the piston-plunger is returned by its spring 6', the abutment 16 of the stem 7, bearing against the forked head 15 of the follower pushes the follower and compresses its spring 22.

For the purpose of holding the brakes applied, or locking the applied brakes without benefit of the brake pedal, as when the foot is removed from the depressed brake pedal, I utilize the follower, and specifically the engagement of the forked head 15 with the abutment 16, for retaining the stem and the piston-plunger in brake-applied position, by locking the follower against movement under tension of the compressed spring 6'

For locking the follower, and incidentally locking the applied brakes, I employ, preferably, a locking detent 25, here shown as a solid cylinder having a notch 26, and journaled to turn in a bearing sleeve 25' integral with the slide bearing sleeve 17 of the slide rod, but disposed transversely thereof with the oscillatable detent located above the slide rod. The notch 26 in the underside of the detent conforms to the exterior contour of the slide rod, and when the detent is in neutral position as shown in the drawings, the slide rod is free to slide transversely of the detent. By turning the detent on its axis, the walls of the notch are brought into frictional contact or engagement with the exterior surface of the slide rod, and this impingement of the detent against the slide rod provides ample friction for holding the rod against longitudinal or sliding movement in either direction. Such engagement of the detent with the slide rod, through the engagement of the forked head 15 with the abutment 16, holds the piston-plunger against the tension of the compressed master spring 6', when the depressed lever or brake pedal is released.

The detent is rocked or turned through the instrumentality of a lever 27, which is fashioned with a forked, clamp head 28 that is frictionally held on the detent by means of the clamp bolt 29 and the nut 30. The range of movement in one direction of the lever is limited by the use of a stop bolt 31 threaded through a lug 32 integral with the slide bearing sleeve of the attaching plate, and a locking nut 33 is employed for securing the stop bolt in adjusted position. The stop bolt is located in the path of movement of the lever, which lever has a laterally bent, lower end 34 which is held up by means of a spring 35 that is attached at one end to the bent end of the lever and at its other end is anchored to a stationary or fixed member, as the steering column of the automobile.

On the end of the lever, as 34, I preferably mount a comparatively thick rubber sleeve 36 which forms a bumper and resilient cushion, and this cushioned end of the detent lever is located in the path of movement of the clutch lever or pedal 37 which is mounted to rock with the shaft 38 that is mounted in suitable bearings.

The clutch pedal is utilized in usual manner on the performance of its customary functions in engaging and in disengaging the clutch, and the pedal is depressed against tension of the spring usually connected thereto as indicated.

The cushioned end of the lever is located in the path of the clutch pedal just beyond the range of movement of the pedal required for engaging and disengaging the clutch, and the spring-returned pedal may readily be depressed, slightly, beyond this range of movement to contact with the cushioned end of the lever, for the purpose of locking the detent. The rubber sleeve or bumper on the lever, against which the pedal contacts, absorbs impact of the pedal against the lever, and by adjustment of the stop bolt 31 the correct position of the cushioned lever with relation to the stroke of the clutch pedal may readily be determined to insure proper functioning of the lever and detent.

By means of the clamp head of the lever on the detent; the adjusting nut 24 on the slide rod of the follower; and the abutment 16 of the piston-plunger stem; the necessary adjustments may, with facility, be made for smooth co-action of the auxiliary device with the master cylinder, the piston-plunger and the brake pedal, and such adjustments together with adjustment of the stop bolt 31 may with equal facility be made for adaptation of the auxiliary device to other hydraulic braking systems of this type.

Having thus fully described my invention, what I claim as new and desire to secure by Letters Patent is:

1. The combination with an automative vehicle and its hydraulic braking system including a master cylinder and connections to the wheel cylinders, of an actuating member for the master cylinder, a separate follower for said member, separate automatic means for activating the follower, a clutch-pedal-operated means for preventing retroaction of the master cylinder actuating member, and automatic means to permit retroaction of the actuating member to release the brake in response to movement of the clutch pedal in clutch engaging direction.

2. In brake holding mechanism for hydraulic braking systems of automotive vehicles, the combination with means for applying the brakes, and a clutch pedal, of separate brake retaining means connected with said brake applying means, and separate means located in the path of and operable upon actuation of the clutch pedal for operating said retaining means in response to movement of the clutch pedal in clutch disengaging direction.

3. The combination with an automotive vehicle and its hydraulic braking system including means for applying the brakes and a reciprocal actuating member therefor, of a separate follower movable with said member and automatic means for activating the follower, a clutch-pedal-operated-means for preventing retroaction of said member in response to movement of the clutch pedal in clutch disengaging direction, and automatic means to permit retroaction of the member to release the brakes when the clutch pedal is moved to engaged position.

4. In a brake-holding device for automotive vehicles, the combination with a reciprocal actuating-member, a separate follower movable with said member and automatic means for actuating the follower, of a detent for coaction with the follower, clutch-pedal-operated-means for engaging the detent with the follower in response to movement of the clutch pedal in clutch disengaging direction, and automatic means for disengaging the detent.

5. In a brake holding device for automotive vehicles, the combination with a reciprocal actuating member, a separate follower unit including a spring-pressed rod for co-action with the actuating member, of a detent for frictional engagement with the rod and means for engaging the detent with the rod, and means for disengaging the detent from the rod comprising spring means constantly acting on said detent.

6. In a brake holding device, the combination with a reciprocal actuating member having an abutment, a follower having an engaging member therefor co-acting with the abutment in one direction and a spring for moving the follower in the other direction, a rotary locking detent, and means for locking said detent against the follower against movement in either direction.

7. In a brake-holding device for automotive vehicles, the combination with a reciprocable actuating member, of a separate follower constantly co-operating with said member for movement in one direction, a spring for moving the follower independently of the member in the other direction, and means for locking said follower against movement in either direction whereby said member is held against brake-releasing movement and spring means normally acting on said locking means to normally hold it in non-locking position.

8. In a brake-holding device for automotive vehicles, the combination with a reciprocable actuating member, of a separate follower constantly co-operating with said member for movement in one direction and a spring for returning the follower independently of the member in the other direction, means for locking the follower against movement in either direction whereby said member is held against brake-releasing movement and spring means normally acting on said locking means to normally hold it in non-locking position.

9. In a holding device for hydraulic braking mechanism, the combination with a master-cylinder and its stem having an adjustable nut thereon, of a follower having a forked end straddling the stem and co-acting with said nut as the stem moves in one direction, a spring for moving the follower in the other direction, a locking detent for co-action with the follower, and means for engaging said detent with the follower to prevent movement of the follower in either direction.

10. In a brake-holding device for automotive vehicles, the combination with a reciprocable actuating member, and a support including a bearing sleeve, of a slide rod mounted in the sleeve and having a forked end engaging said actuating member, said rod adapted to move with said member in one direction and a spring for returning the rod in the other direction, and means for locking the follower against movement whereby the actuating member is locked against brake releasing movement.

11. In a brake-holding device for automotive vehicles having a clutch pedal, the combination with a reciprocable actuating member for the braking system, and a support including a bearing sleeve, of a slide rod mounted in the sleeve and engaging said member to move therewith in one direction, a spring for returning the rod in the other direction, a rotary detent mounted in the sleeve for engagement with the slide rod, and a lever connected with the detent and located in the path of movement of the clutch pedal.

12. In a brake-holding device for automotive vehicles having a clutch pedal, the combination with a reciprocable actuating member for a braking system and an abutment on said member, and a support including a bearing sleeve, of a slide rod mounted in the sleeve, said rod having a forked-end engaging one side only of the abutment whereby said member and rod move in unison in one direction, a spring for returning the rod in the other direction, a locking device to hold the rod against movement in either direction, and means operated by movement of the clutch pedal to actuate the locking device, whereby the actuating member is locked against brake-releasing movement.

13. In a brake holding device for automotive vehicles having a clutch pedal, the combination with a reciprocating actuating member for a braking system and an abutment on said member, and a support including a bearing sleeve, of a slide rod mounted in the sleeve, said rod having a forked-end engaging one side only of the abutment whereby said member and rod move in unison in one direction, a spring for returning the rod in the other direction, a rotary detent mounted in the sleeve for frictional engagement with the slide rod, and a lever-arm mounted on the rotary detent and located in the path of movement of the clutch pedal.

14. In a brake-holding device for automotive vehicles having a clutch pedal, the combination with a reciprocable brake-actuating member, of a spring-returned follower adapted to move in one direction with said member, means adapted to lock the follower against movement in either direction, a spring-returned lever operatively connected to said means and located in the path of movement of the clutch pedal, and a stop device in the path of movement of the spring-returned lever.

15. In a brake-holding device for automotive vehicles having a clutch pedal, the combination with a reciprocable brake-actuating member, of a spring-returned follower adapted to move in one direction with said member, a rotary detent adapted to lock the follower against movement in either direction, a spring-returned lever having an adjustable connection with said detent and located in the path of movement of the clutch pedal, and an adjustable stop device in the path of movement of the free end of the spring-returned lever.

16. In a brake holding device for automotive vehicles having a clutch pedal, the combination with a reciprocable brake-actuating member, of a spring-returned follower adapted to move in one direction with said member, means adapted to lock the follower against movement in either direction, and a spring-returned lever operatively connected to said means and located in the path of movement of the clutch pedal.

17. In a holding mechanism for hydraulic brakes, the combination with brake-applying means and actuating means therefor, and a separate clutch pedal, of a separate brake-retaining means adapted to follow the brake-applying means when the brakes are applied, and means separate from and located in the path of movement of the clutch pedal for actuating the retaining means to hold the brakes applied in response to movement of the clutch pedal in clutch disengaging direction.

18. The combination with an automotive vehicle and its clutch engaging and disengaging mechanism, a hydraulic braking mechanism including a master cylinder, a piston for the master cylinder, and actuating means for the piston, of means interposed between said mechanisms and separate therefrom and engagable by said clutch mechanism and adapted to engage said braking mechanism and to prevent movement of the piston actuating means to release the brakes in response to movement of said clutch mechanism in clutch disengaging direction.

DOUGLAS COLLINS.